United States Patent
Ito et al.

(10) Patent No.: US 10,857,805 B2
(45) Date of Patent: *Dec. 8, 2020

(54) TREATMENT AGENT FOR IMAGE RECORDING, SET INCLUDING INK AND TREATMENT AGENT FOR IMAGE RECORDING, AND RECORDING METHOD

(71) Applicant: Brother Kogyo Kabushiki Kaisha, Nagoya (JP)

(72) Inventors: Shinpei Ito, Nagoya (JP); Yasuhiro Taga, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,908

(22) Filed: Feb. 6, 2019

(65) Prior Publication Data
US 2019/0301084 A1 Oct. 3, 2019

(30) Foreign Application Priority Data
Mar. 30, 2018 (JP) ................................. 2018-070306

(51) Int. Cl.
*C09D 11/54* (2014.01)
*B41J 2/21* (2006.01)
(Continued)

(52) U.S. Cl.
CPC ............. *B41J 2/2107* (2013.01); *C09D 11/54* (2013.01); *D06P 1/445* (2013.01); *D06P 1/5285* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,609,671 A 3/1997 Nagasawa
5,837,045 A 11/1998 Johnson et al.
(Continued)

FOREIGN PATENT DOCUMENTS

JP H08-003498 A 1/1996
JP 2000-513396 A 10/2000
(Continued)

OTHER PUBLICATIONS

Sigma-Aldrich: MSDS Lauryl Trimethyl Ammonium Chloride (p. 1-9) Jan. 15, 2020.*

*Primary Examiner* — Manish S Shah
(74) *Attorney, Agent, or Firm* — Banner & Witcoff, Ltd.

(57) ABSTRACT

A treatment agent for image recording includes a cationic polymer emulsion and a cationic surfactant. A set usable for recording on a fabric includes a water-based ink for ink-jet recording including a colorant and water; and the treatment agent for image recording. A recording method for recording on a fabric by using the set includes: applying the treatment agent for image recording to the fabric; drying the treatment agent for image recording applied to the fabric; and jetting the water-based ink onto the fabric by an ink-jet system.

10 Claims, 4 Drawing Sheets

(51) Int. Cl.
  *C09D 11/328*   (2014.01)
  *D06P 1/44*    (2006.01)
  *D06P 1/52*    (2006.01)
  *D06P 1/651*   (2006.01)
  *D06P 5/30*    (2006.01)
  *D06P 1/645*   (2006.01)

(52) U.S. Cl.
  CPC .......... *D06P 1/645* (2013.01); *D06P 1/65118* (2013.01); *D06P 5/30* (2013.01); *C09D 11/328* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
  See application file for complete search history.

(56) References Cited

U.S. PATENT DOCUMENTS

| | | | |
|---|---|---|---|
| 8,016,404 | B2 | 9/2011 | Kato et al. |
| 8,690,304 | B2 | 4/2014 | Sugimoto et al. |
| 2003/0064206 | A1* | 4/2003 | Koyano ............... B41M 5/0017 428/195.1 |
| 2004/0204535 | A1* | 10/2004 | Confalone ........... B41M 5/5245 428/500 |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0241398 | A1 | 10/2008 | Kato et al. |
| 2009/0229489 | A1 | 9/2009 | Gu |
| 2011/0200751 | A1* | 8/2011 | Yatake ................... B41J 3/4078 427/261 |
| 2012/0081459 | A1 | 4/2012 | Sugimoto et al. |
| 2014/0186533 | A1* | 7/2014 | Kitagawa ................. D06P 5/30 427/288 |
| 2015/0174939 | A1* | 6/2015 | Aoyama ............. B41M 5/0017 347/21 |
| 2015/0273884 | A1* | 10/2015 | Ohishi ................. B41J 11/0015 347/21 |
| 2015/0273885 | A1* | 10/2015 | Imai ........................... B41J 2/01 347/21 |
| 2015/0274992 | A1* | 10/2015 | Aoyama ................ C09D 11/54 347/21 |
| 2017/0058453 | A1 | 3/2017 | Pan et al. |

FOREIGN PATENT DOCUMENTS

| | | |
|---|---|---|
| JP | 2008-524400 A | 7/2008 |
| JP | 2008-246821 A | 10/2008 |
| JP | 2009-515007 A | 4/2009 |
| JP | 2011-025504 A | 2/2011 |
| JP | 2011-515535 A | 5/2011 |
| JP | 2012-091491 A | 5/2012 |
| JP | 2017-517640 A | 6/2017 |
| JP | 2018-003184 A | 1/2018 |

* cited by examiner

TREATMENT AGENT FOR IMAGE RECORDING, SET INCLUDING INK AND TREATMENT AGENT FOR IMAGE RECORDING, AND RECORDING METHOD

CROSS REFERENCE TO RELATED APPLICATION

The present application claims priority from Japanese Patent Application No. 2018-070306 filed on Mar. 30, 2018 the disclosure of which is incorporated herein by reference in its entirety.

BACKGROUND

Field of the Invention

The present invention relates to a treatment agent for image recording, a set including an ink and the treatment agent for image recording, and a recording method.

Description of the Related Art

There is known a recording method in which recording is performed by jetting an ink on a fabric (cloth) in accordance with an ink-jet system. The recording method includes, for example, a pretreatment step of applying a pretreatment agent to a pretreatment agent application portion of the fabric, an ink jetting step of jetting an ink to the pretreatment agent application portion, and a heat fixing step of performing heat-fixing of the ink to the fabric (Published Japanese Translation of PCT International Publication for Patent Application No. 2017-517640 corresponding to United States Patent Application Publication No. 2017/0058453).

When recording is performed on a fabric by using a water-based ink for ink-jet recording, the fabric on which recording is performed desirably has a high optical density (OD value), a high image quality, and good fastness to washing.

In view of the above, an object of the present teaching is to provide a treatment agent for image recording (hereinafter referred to as a treatment agent in some cases) which allows a fabric on which recording is performed using the treatment agent to have a high optical density (OD value) and good fastness to washing.

SUMMARY

According to a first aspect of the present teaching, there is provided a treatment agent for image recording including: a cationic polymer emulsion; and a cationic surfactant.

According to a second aspect of the present teaching, there is provided a set usable for recording on a fabric, the set including: a water-based ink for ink-jet recording including a colorant and water; and the treatment agent for image recording as defined in the first aspect.

According to a third aspect of the present teaching, there is provided a recording method for recording on a fabric by using the set as defined in the second aspect, the recording method including: applying the treatment agent for image recording to the fabric; drying the treatment agent for image recording applied to the fabric; and jetting the water-based ink onto the fabric by an ink-jet system.

DESCRIPTION OF THE EMBODIMENTS

In the present teaching, fastness to washing means a change in density of an image recorded on a fabric caused after washing. The fastness to washing can be determined, for example, by test methods for color fastness to washing and laundering (JIS L 0844:2011 corresponding to ISO105-C06, C08, C09, C10 and C12).

<Treatment Agent for Image Recording>

A treatment agent for image recording of the present teaching is explained. The treatment agent for image recording of the present teaching includes a cationic polymer emulsion and a cationic surfactant.

The cationic polymer emulsion is made, for example, from cationic polymer particles (resin fine particles) and a dispersion medium (e.g., water). The resin fine particles are dispersed in the dispersion medium while having a particular particle size, instead of dissolving in the dispersion medium. Namely, the cationic polymer emulsion includes the dispersion medium and the cationic polymer particles dispersed in the dispersion medium. The cationic polymer emulsion may include a water insoluble cationic polymer or a poorly water soluble cationic polymer. The treatment agent of the present teaching including the cationic polymer emulsion thus improves the water resistance of the fabric (printed matter) on which recording is performed, when compared, for example, with a treatment agent including a water-soluble cationic polymer that forms no emulsion. This allows the printed matter using the treatment agent of the present teaching to have good fastness to washing.

The cationic polymer in the cationic polymer emulsion includes, for example, a cationic functional group, such as an organic amine.

The cationic polymer emulsion is exemplified, for example, by a cationic polymer emulsion having a urethane structure and a cationic styrene-acrylic emulsion. The above-described cationic polymer emulsion may have the urethane structure. Namely, the cationic polymer in the cationic polymer emulsion may have the urethane structure. This improves a tactile sensation of the fabric (e.g., the feel of the fabric) on which recording is performed. The urethane structure may be an ester-based urethane structure. Namely, the cationic polymer may have the ester-based urethane structure. The ester-based urethane structure further improves the tactile sensation of the fabric (e.g., the feel of the fabric) on which recording is performed. The cationic polymer having the urethane structure, in particular, the cationic polymer having the ester-based urethane structure can form a flexible film when dried. This inhibits the fabric to which the treatment agent is applied from hardening, thus improving the tactile sensation of the fabric (e.g., the feel of the fabric) on which recording is performed (i.e., the tactile sensation of the printed matter).

A minimum film-forming temperature of the cationic polymer emulsion is preferably equal to or less than 40° C. The minimum film-forming temperature may be, for example, equal to or less than 20° C. or equal to or less than 5° C. The minimum film-forming temperature in the present teaching means, for example, a minimum temperature required to allow the polymer emulsion to become a film by heating. The minimum film-forming temperature can be determined, for example, in accordance with determination of minimum film-forming temperature (JIS K 6828-2:2003 corresponding to ISO2115:1996). Specifically, a polymer emulsion is lightly applied, for example, to an aluminum plate having temperature gradient. Then, the minimum film-forming temperature can be determined, as a temperature at which a dried coating film is formed, by use of a minimum film-forming temperature measurement apparatus. The minimum film-forming temperature measurement apparatus is exemplified, for example, by MINIMUM FILM FORMING TEMPERATURE BAR 90 produced by RHOPOINT INSTRUMENTS LTD.

The cationic polymer emulsion may be privately prepared in-house, or any commercially available product may be used as the cationic polymer emulsion. The commercially available product is exemplified, for example, by MOWINYL (trade name) 6910 (a cationic polymer emulsion having an ester-based urethane structure) and MOWINYL (trade name) 6901 (a cationic styrene-acrylic emulsion) manufactured by JAPAN COATING RESIN CO., LTD.; and SUPERFLEX (trade name) 620 (a cationic polymer emulsion having an ester-based urethane structure) and SUPERFLEX (trade name) 650 (a cationic polymer emulsion having a urethane structure) manufactured by DKS CO., LTD. (Dai-ichi Kogyo Seiyaku Co., Ltd.). Only one kind of the cationic polymer emulsion as described above may be used singly, or two or more kinds of the cationic polymer emulsions may be used in combination.

The average particle size (average particle diameter) of the cationic polymer emulsion, namely, the average particle size of particles of the cationic polymer in the cationic polymer emulsion is, for example, in a range of 100 nm to 300 nm. The average particle size can be determined, as the arithmetic mean diameter, by using a dynamic light scattering type particle diameter distribution measuring apparatus LB-500 produced by HORIBA, Ltd.

The cationic polymer emulsion having the urethane structure preferably has at least one of an acrylic structure and a styrene structure in a portion, of the cationic polymer emulsion having the urethane structure, different from the urethane structure. The cationic polymer emulsion having the urethane structure more preferably has the acrylic structure (i.e., a urethane-acrylic emulsion is more preferable). Of the above commercially available products, MOWINYL (trade name) 6910, SUPERFLEX (trade name) 620, and SUPERFLEX (trade name) 650 correspond to the urethane-acrylic emulsion.

A ratio of a part of the urethane structure (a ratio of occupation of the urethane structure, or a ratio of the urethane structure) is preferably equal to or more than 10% by mass, more preferably equal to or more than 20% by mass in the cationic polymer emulsion having the urethane structure. The ratio of the urethane structure means a ratio of the urethane structure to a solid content amount (the cationic polymer having the urethane structure) of the cationic polymer emulsion having the urethane structure. The urethane structure may be preferably a portion obtained from: aliphatic isocyanate; and polyether polyol or polyester polyol.

A content (X) of the cationic polymer emulsion in an entire amount of the treatment agent for image recording is, for example, in a range of 1% by mass to 40% by mass, in a range of 2% by mass to 25% by mass, or in a range of 2.5% by mass to 20% by mass. Making the content (X) equal to or more than 2.5% by mass improves the fastness to washing of the fabric on which recording is performed. Making the content (X) equal to or less than 20% by mass improves the tactile sensation of the fabric (e.g., the feel of the fabric) on which recording is performed. The content (X) means a solid content amount of the cationic polymer emulsion in the entire amount of the treatment agent for image recording. Namely, the content (X) is a content of the cationic polymer in the cationic polymer emulsion in the entire amount of the treatment agent for image recording.

The treatment agent may or may not include a cationic polymer emulsion having no urethane structure. In view of the tactile sensation of the fabric after recording, however, the content (% by mass) of the cationic polymer emulsion having no urethane structure is preferably smaller than the content (% by mass) of the cationic polymer emulsion (cationic urethane emulsion) having the urethane structure. From the same point of view, it is preferable for the treatment agent not to virtually include the cationic polymer emulsion having no urethane structure. Namely, it is preferably for the cationic polymer emulsion to include substantially only the cationic polymer emulsion which includes the cationic polymer having the urethane structure. A ratio of the solid content of the cationic urethan emulsion to the total solid content of all the cationic polymer emulsions in the treatment agent is, for example, equal to or more than 50% by mass, equal to or more than 90% by mass, or 100% by mass.

The cationic surfactant described above is exemplified, for example, by quaternary ammonium salt, quaternary ammonium ion, primary, secondary, and tertiary amine salt type compounds, alkylamine salt, dialkylamine salt, aliphatic amine salt, alkylpyridinium salt, imidazolinium salt, sulfonium salt, phosphonium salt, and onium salt. Specific examples of the cationic surfactant other than the quaternary ammonium salt and the quaternary ammonium ion include, for example, hydrochlorides and acetates of laurylamine, palm amine, and rosin amine; cetylpyridinium chloride, cetylpyridinium bromide, and dihydroxyethyllaurylamine. Among them, the quaternary ammonium salt and the quaternary ammonium ion are preferably used.

The quaternary ammonium salt is exemplified, for example, by a cationic compound represented by the following formula (1).

(1)

In the formula (1), each of $R^1$ to $R^4$ is a hydrocarbon group having 1 to 30 carbon atoms; $R^1$ to $R^4$ may be identical with each other or different from each other, and $X^-$ is an anion.

In the formula (1), each of $R^1$ to $R^3$ may be an alkyl group having 1 to 5 carbon atoms. The alkyl group having 1 to 5 carbon atoms may have a straight chain or a branched chain, and is exemplified, for example, by methyl group, ethyl group, n-propyl group, isopropyl group, n-butyl group, sec-butyl group, isobutyl group, tert-butyl group, n-pentyl group, isopentyl group, sec-pentyl group, 3-pentyl group, and tert-pentyl group. The alkyl group having 1 to 5 carbon atoms may have a substituent group such as halogen atom. In the formula (1), $R^1$ to $R^3$ may be identical with each other or different from each other.

In the formula (1), $R^4$ may be an alkyl group having 6 to 30 carbon atoms. The alkyl group having 6 to 30 carbon atoms is exemplified, for example, by hexyl group, heptyl group, octyl group, nonyl group, decyl group, lauryl group (dodecyl group), tetradecyl group, and cetyl group (hexadecyl group). The alkyl group having 6 to 30 carbon atoms may have a substituent group such as halogen atom, and may have either a straight chain or a branched chain.

In the formula (1), $X^-$ is an anion. Although the anion may be any anion, the anion may be exemplified, for example, by methylsulfate ion, ethylsulfate ion, sulfate ion, nitrate ion, acetate ion, dicarboxylate (e.g., malate, itaconate) ion, tricarboxylate (e.g., citrate) ion, hydroxide ion, and halide ion. When $X^-$ is dicarboxylate ion or tricarboxylate ion, dicarboxylate ion or tricarboxylate ion is the counter ion for two or three quaternary ammonium ions (cations obtained by removing $X^-$ from the formula (1)).

The cationic compound represented by the formula (1) is exemplified, for example, by lauryltrimethylammonium sulfate, lauryltrimethylammonium chloride, cetyltrimethylammonium chloride, and benzyldimethylalkylammonium chloride. The cationic compound represented by the formula (1) may be privately prepared in-house, or any commercially available product may be used as the cationic compound represented by the formula (1). The commercially available product is exemplified, for example, by Catiogen (trade name) TML, Catiogen (trade name) TMP, and Catiogen (trade name) ES-O produced by DKS CO., LTD. (Dai-ichi Kogyo Seiyaku Co., Ltd.), and Benzalkonium chloride produced by Tokyo Kasei Kogyo Co., Ltd.

The quaternary ammonium ion is exemplified, for example, by a cation obtained by removing $X^-$ from the formula (1).

A content (Y) of the cationic surfactant in the entire amount of the treatment agent for image recording is, for example, in a range of 0.05% by mass to 20% by mass, in a range of 0.1% by mass to 10% by mass, or in a range of 0.5% by mass to 4% by mass. The content (Y) is an active ingredient amount.

The treatment agent for image recording of the present teaching includes both the cationic polymer emulsion and the cationic surfactant. This allows the fabric on which recording is performed by use of the treatment agent for image recording of the present teaching to have a high optical density (OD value) and good fastness to washing. This mechanism is assumed, as follows. Namely, a treatment agent for image recording that only includes the cationic polymer emulsion makes the optical density (OD value) low, as shown in Comparative Example 1 described below. The reason why the optical density (OD value) is reduced is considered, as follows. Namely, when the treatment agent for image recording that only includes the cationic polymer emulsion is dried, the viscosity thereof increases to form a film. This makes difficult for the water-based ink to permeate the fabric, leading to a white streak line. Meanwhile, a treatment agent for image recording that only includes the cationic surfactant has bad fastness to washing, as shown in Comparative Example 3 described below. The treatment agent for image recording of the present teaching, however, includes both the cationic polymer emulsion and the cationic surfactant. This provides good fastness to washing and makes the water-based ink easily permeate the fabric to enhance the optical density (OD value). In a case of using any other surfactant than the cationic surfactant, as shown in Comparative Example 2 described below, a colorant in the water-based ink, such as an anionic dye, has difficulty in staying on a surface of the fabric, thus reducing the optical density (OD value). This mechanism is just an assumption, and the present teaching is not limited thereto.

The treatment agent for image recording preferably satisfies the following condition (2) or condition (3). The treatment agent for image recording that satisfies the condition (2) allows the fabric on which recording is performed by use of the treatment agent satisfying the condition (2) to have a higher optical density (OD value) and better fastness to washing. The treatment agent for image recording that satisfies the condition (3) allows the fabric on which recording is performed by use of the treatment agent satisfying the condition (3) to have a still higher optical density (OD value) and still better fastness to washing.

$0.6 \leq X/Y \leq 30$   Condition (2):

$1.3 \leq X/Y \leq 20$   Condition (3):

X: the solid content amount (by mass) of the cationic polymer emulsion in the entire amount of the treatment agent for image recording Y: the content (% by mass) of the cationic surfactant in the entire amount of the treatment agent for image recording It is preferable for the treatment agent for image recording not to virtually include an anionic surfactant. The anionic surfactant may interact with the cationic polymer emulsion, which may inhibit the interaction between the cationic polymer emulsion and the colorant in the ink. The content of the anionic surfactant in the entire amount of the treatment agent for image recording is, for example, 0% by mass or in a range of 0% by mass to 0.01% by mass.

The treatment agent for image recording may further include a water-soluble organic solvent. The water-soluble organic solvent is exemplified, for example, by a humectant.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One kind of the humectant as described above may be used singly, or two or more kinds of the humectants may be used in combination. Among the above-described humectants, a polyvalent alcohol such as alkylene glycol (e.g., propylene glycol) or glycerol is preferably used. The propylene glycol is more preferably used because it is harmless to humans and has a good balance between humidity (wettability) and volatility.

The content of the humectant in the entire amount of the treatment agent for image recording is, for example, in a range of 0% by mass to 80% by mass, in a range of 1% by mass to 60% by mass, or in a range of 5% by mass to 50% by mass. When the treatment agent for image recording includes propylene glycol, a mass ratio of propylene glycol in the entire amount of the water-soluble organic solvent in the treatment agent for image recording is, for example, equal to or more than 80% by mass, equal to or more than 95% by mass, or 100% by mass. Making the mass ratio of propylene glycol within each of the ranges results in the treatment agent for image recording that is harmless to humans and has a good balance between humidity (wettability) and volatility. The water-soluble organic solvent may include substantially only the propylene glycol.

The treatment agent for image recording may further include a water-soluble organic solvent other than the humectant. The water-soluble organic solvent other than the humectant is exemplified, for example, by a penetrant that adjusts the drying velocity on a recording medium.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination.

The content of the penetrant in the entire amount of the treatment agent for image recording is, for example, in a range of 0% by mass to 20% by mass, in a range of 0% by mass to 15% by mass, or in a range of 1% by mass to 4% by mass.

The treatment agent for image recording may further include water. The water is preferably ion-exchange water or purified water (pure water). A content (W) of the water in the entire amount of the treatment agent for image recording is, for example, in a range of 10% by mass to 90% by mass, in a range of 20% by mass to 80% by mass, equal to or more than 40% by mass, or in a range of 40% by mass to 80% by mass. The content (W) may be, for example, a balance of the other components.

The treatment agent for image recording may further include a conventionally known additive, as necessary. The additive is exemplified, for example, by pH-adjusting agents, viscosity-adjusting agents, surface tension-adjusting agents, and fungicides. The viscosity-adjusting agents are exemplified, for example, by polyvinyl alcohol, cellulose, and water-soluble resin.

In order not to affect the color of the printed matter, it is preferable for the treatment agent not to virtually include a colorant such as a dye and pigment. The content of the colorant in the entire amount of the treatment agent is, for example, in a range of 0% by mass to 1% by mass or in a range of 0% by mass to 0.1% by mass.

The treatment agent for image recording can be prepared, for example, by uniformly mixing the cationic polymer emulsion, the cationic surfactant, and an optionally other additive(s) as necessary, by a conventionally known method. The treatment agent may be, for example, an aqueous treatment agent (treatment agent-liquid) or a gel treatment agent. When the treatment agent is the aqueous treatment agent (treatment agent-liquid) or the gel treatment agent, the treatment agent can be easily coated on (applied to) the recording medium.

The viscosity of the treatment agent for image recording is, for example, equal to or less than 100 mPa·s, equal to or less than 20 mPa·s, or equal to or less than 10 mPa·s. The viscosity is a value measured at 25° C.

The treatment agent for image recording of the present teaching can be preferably used for recording on the fabric. In addition to that, the treatment agent for image recording of the present teaching can be used for recording, for example, on any other recording medium than the fabric, such as a recording paper. The fabric includes both of knitted items and textiles. The material of the fabric may be either natural fibers or synthetic fibers. The natural fibers include, for example, cotton and silk. The synthetic fibers include, for example, urethane, acryl, polyester, and nylon.

As described above, since the treatment agent for image recording of the present teaching includes both the cationic polymer emulsion and the cationic surfactant, the fabric on which recording is performed by use of the treatment agent for image recording of the present teaching has a high optical density (OD value) and good fastness to washing.

<Set Including Ink and Treatment Agent for Image Recording>

Subsequently, a set including an ink and a treatment agent for image recording according to the present teaching is explained. The set including the ink and the treatment agent for image recording according to the present teaching, which is a set including an ink and a treatment agent for image recording that is used for recording on a fabric, includes a water-based ink for ink-jet recording (hereinafter also referred to as a water-based ink or an ink) and the treatment agent for image recording of the present teaching. The set including the ink and the treatment agent for image recording according to the present teaching may include only one kind of the water-based ink or two or more kinds of the water-based inks.

<Water-Based Ink>

The water-based ink is explained. The water-based ink includes a colorant and water. The colorant is exemplified, for example, by an anionic dye. The cationic polymer emulsion and the cationic surfactant in the treatment agent counteract or negate an electrical charge of the anionic dye, which causes the anionic dye to aggregate or thicken. This allows the printed matter (the fabric on which recording is performed) to have a high optical density (OD value) and good fastness to washing.

The anionic dye is not particularly limited, and is exemplified, for example, by direct dyes, acid dyes, reactive dyes, and food dyes.

The direct dye is not specifically limited, and is exemplified, for example, by C. I. Direct Black, C. I. Direct Blue, C. I. Direct Red, C. I. Direct Yellow, C. I. Direct Orange, C. I. Direct Violet, C. I. Direct Brown, and C. I. Direct Green. C. I. Direct Black described above is exemplified, for example, by C. I. Direct Blacks 17, 19, 22, 31, 32, 51, 62, 71, 74, 108, 112, 113, 146, 154, 168, and 195. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, and 226. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, and 230. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, and 173. C. I. Direct Orange described above is exemplified, for example, by C. I. Direct Oranges 34, 39, 44, 46, and 60. C. I. Direct Violet described above is exemplified, for example, by C. I. Direct Violets 47 and 48. C. I. Direct Brown described above is exemplified, for example, by C. I. Direct Brown 109. C. I. Direct Green described above is exemplified, for example, by C. I. Direct Green 59.

The acid dye is not specifically limited, and is exemplified, for example, by C. I. Acid Black, C. I. Acid Blue, C. I. Acid Red, C. I. Acid Yellow, C. I. Acid Orange, and C. I. Acid Violet. C. I. Acid Black described above is exemplified, for example, by C. I. Acid Blacks 2, 7, 24, 26, 31, 48, 51, 52, 63, 110, 112, 115, 118, and 156. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, and 234. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, and 317. C. I. Acid Yellow described above is exemplified, for example, by C. I. Acid Yellows 1, 3, 7, 11, 17, 23, 25, 29, 36, 38, 40, 42, 44, 61, 71, 76, 98, and 99. C. I. Acid Orange described above is exemplified, for example, by C. I. Acid Oranges 7 and 19. C. I. Acid Violet described above is exemplified, for example, by C. I. Acid Violet 49.

The reactive dye is not specifically limited, and is exemplified, for example, by C. I. Reactive Blue, C. I. Reactive Red. and C. I. Reactive Yellow. C. I. Reactive Blue described above is exemplified, for example, by C. I. Reactive Blues 4, 5, 7, 13, 14, 15, 18, 19, 21, 26, 27, 29, 32, 38, 40, 44, and 100. C. I. Reactive Red described above is exemplified, for example, by C. I. Reactive Reds 7, 12, 13, 15, 17, 20, 23, 24, 31, 42, 45, 46, and 59. C. I. Reactive Yellow described above is exemplified, for example, by C. I. Reactive Yellows 2, 3, 17, 25, 37, and 42.

The food dye is not specifically limited, and is exemplified, for example, by C. I. Food Black, C. I. Food Red. and C. I. Food Yellow. C. I. Food Black described above is exemplified, for example, by C. I. Food Blacks 1 and 2. C. I. Food Red described above is exemplified, for example, by C. I. Food Reds 87, 92, and 94. C. I. Food Yellow described above is exemplified, for example, by C. I. Food Yellow 3.

One kind of the anionic dye as described above may be used singly, or two or more kinds of the anionic dyes as described above may be used in combination. The content of the anionic dye in the entire amount of the water-based ink is, for example, in a range of 0.1% by mass to 20% by mass, in a range of 1% by mass to 15% by mass, or in a range of 2% by mass to 10% by mass.

In addition to or instead of the anionic dye, the water-based ink may include any other colorant than the anionic dye, such as a pigment or a dye other than the anionic dye.

The pigment is exemplified, for example, by resin-dispersed pigments (resin-dispersible pigments, resin dispersion type pigments) and self-dispersible pigments.

The resin-dispersed pigment is dispersible in water by using, for example, a pigment dispersing resin (resin dispersant). A pigment usable as the resin-dispersed pigment is not particularly limited, which is exemplified, for example, by carbon black, an inorganic pigment, and an organic pigment. The carbon black is exemplified, for example, by furnace black, lamp black, acetylene black, and channel black. The inorganic pigment is exemplified, for example, by titanium oxide, iron oxide-based inorganic pigments, and carbon black-based inorganic pigments. The organic pigment is exemplified, for example, by azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Specific examples of the above pigments include, for example, C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

The self-dispersible pigment is dispersible in water without using any dispersing agent, for example, owing to the fact that at least one of the hydrophilic functional group and the salt thereof including, for example, a carbonyl group, a hydroxyl group, a carboxylic acid group, a sulfonic acid group, and a phosphoric acid group is introduced into the particles of the pigment by the chemical bond directly or with any group intervening therebetween. As the self-dispersible pigment, it is possible to use a self-dispersible pigment in which the pigment is subjected to a treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, Published Japanese Translation of PCT International Publication for Patent Application No. 2009-515007 corresponding to United States Patent Application Publication Nos. 2007/0100023 and 2007/0100024, and Published Japanese Translation of PCT International Publication for Patent Application No. 2011-515535 corresponding to United States Patent Application Publication No. 2009/0229489. The pigment which is suitable to perform the treatment as described above is exemplified by carbon blacks including, for example, MA8. MA100 and #2650 produced by Mitsubishi Chemical Corporation; and Carbon Black FW200 produced by Degussa. As the self-dispersible pigment, it is also allowable to use, for example, any commercially available product. The commercially available product is exemplified, for example, by CAB-O-JET (trade name) 200, CAB-O-JET (trade name) 250C, CAB-O-JET (trade name) 260M, CAB-O-JET (trade name) 270Y, CAB-O-JET (trade name) 300, CAB-O-JET (trade name) 400, CAB-O-JET (trade name) 450C, CAB-O-JET (trade name) 465M, and CAB-O-JET (trade name) 470Y produced by CABOT CORPORATION; BONJET (trade name) BLACK CW-2 and BONJET (trade name) BLACK CW-3 produced by Orient Chemical Industries, Ltd.; and LIOJET (trade name) WD BLACK 002C produced by Toyo Ink Mfg. Co., Ltd.

One kind of the pigment as described above may be used singly, or two or more kinds of the pigments as described above may be used in combination. The solid content amount of the pigment in the entire amount of the water-based ink is, for example, in a range of 0.1% by mass to 20% by mass, in a range of 1% by mass to 15% by mass, or in a range of 2% by mass to 10% by mass.

The water is preferably ion-exchange water or purified water (pure water). The content of the water in the entire amount of the water-based ink is, for example, in a range of 10% by mass to 90% by mass, in a range of 40% by mass to 80% by mass, or in a range of 50% by mass to 80% by mass. The content of the water in the entire amount of the water-based ink may be, for example, a balance of the other components.

The water-based ink may further include a water-soluble organic solvent. The water-soluble organic solvent is exemplified, for example, by a humectant that inhibits the water-based ink from drying at an end of a nozzle in an ink-jet head and a penetrant that adjusts the drying velocity on a recording medium.

The humectant is not particularly limited, and includes, for example, those exemplified as the humectants for the treatment agent. One kind of the humectant as described above may be used singly, or two or more kinds of the humectants may be used in combination. The content of the humectant in the entire amount of the water-based ink is, for example, in a range of 0% by mass to 95% by mass, in a range of 5% by mass to 80% by mass, or in a range of 5% by mass to 50% by mass.

The penetrant is not particularly limited, and includes, for example, those exemplified as the penetrants for the treatment agent. One kind of the penetrant as described above may be used singly, or two or more kinds of the penetrants may be used in combination. The content of the penetrant in the entire amount of the water-based ink is, for example, in a range of 0% by mass to 20% by mass, in a range of 0% by mass to 15% by mass, or in a range of 1% by mass to 4% by mass.

The water-based ink may further include a surfactant and the additive(s) similar to those exemplified as the additives for the treatment agent for image recording, as necessary.

The water-based ink can be prepared, for example, by uniformly mixing the colorant, the water, and an optionally other additive(s) as necessary, by a conventionally known method, and then removing any non-dissolved matter, with a filter or the like.

The treatment agent for image recording in the set including the ink and the treatment agent for image recording according to the present teaching is the same as or equivalent to the above-described treatment agent for image recording according to the present teaching. The explanation for the above-described treatment agent for image recording according to the present teaching can be thus incorporated therein.

The set including the ink and the treatment agent for image recording according to the present teaching may be used suitably for recording on the fabric. The set may be also used for recording on any other recording medium than the fabric, such as recording paper.

<Recording Method and Ink-Jet Recording Apparatus>

Subsequently, a recording method of the present teaching is explained.

The recording method of the present teaching is a recording method of recording on a fabric by use of a set including an ink and a treatment agent for image recording, the method including: a treatment agent applying step of applying the treatment agent for image recording on the fabric; a drying step of drying the treatment agent for image recording applied on the fabric; and a recording step of recording by jetting the water-based ink on the fabric by means of an ink-jet system. The recording includes printing a letter (text), printing an image, printing, and the like.

The set including the ink and the treatment agent for image recording used for the recording method of the present teaching is the same as or equivalent to the set including the ink and the treatment agent for image recording according to the present teaching described above. The explanation for the set including the ink and the treatment agent for image recording according to the present teaching described above can be thus incorporated therein.

The recording method of the present teaching can be performed, for example, by using an ink-jet recording apparatus (am image recording apparatus) of the present teaching described below.

The ink-jet recording apparatus of the present teaching is an ink-jet recording apparatus including: an ink set accommodating section; a treatment agent applying mechanism; and an ink jetting mechanism. The set including the ink and the treatment agent for image recording according to the present teaching is accommodated in the ink set accommodating section; the treatment agent for image recording in the set including the ink and the treatment agent for image recording is applied to a recording medium by the treatment agent applying mechanism; and the water-based ink in the set including the ink and the treatment agent for image recording is jetted onto the recording medium by the ink jetting mechanism.

Figure 1:
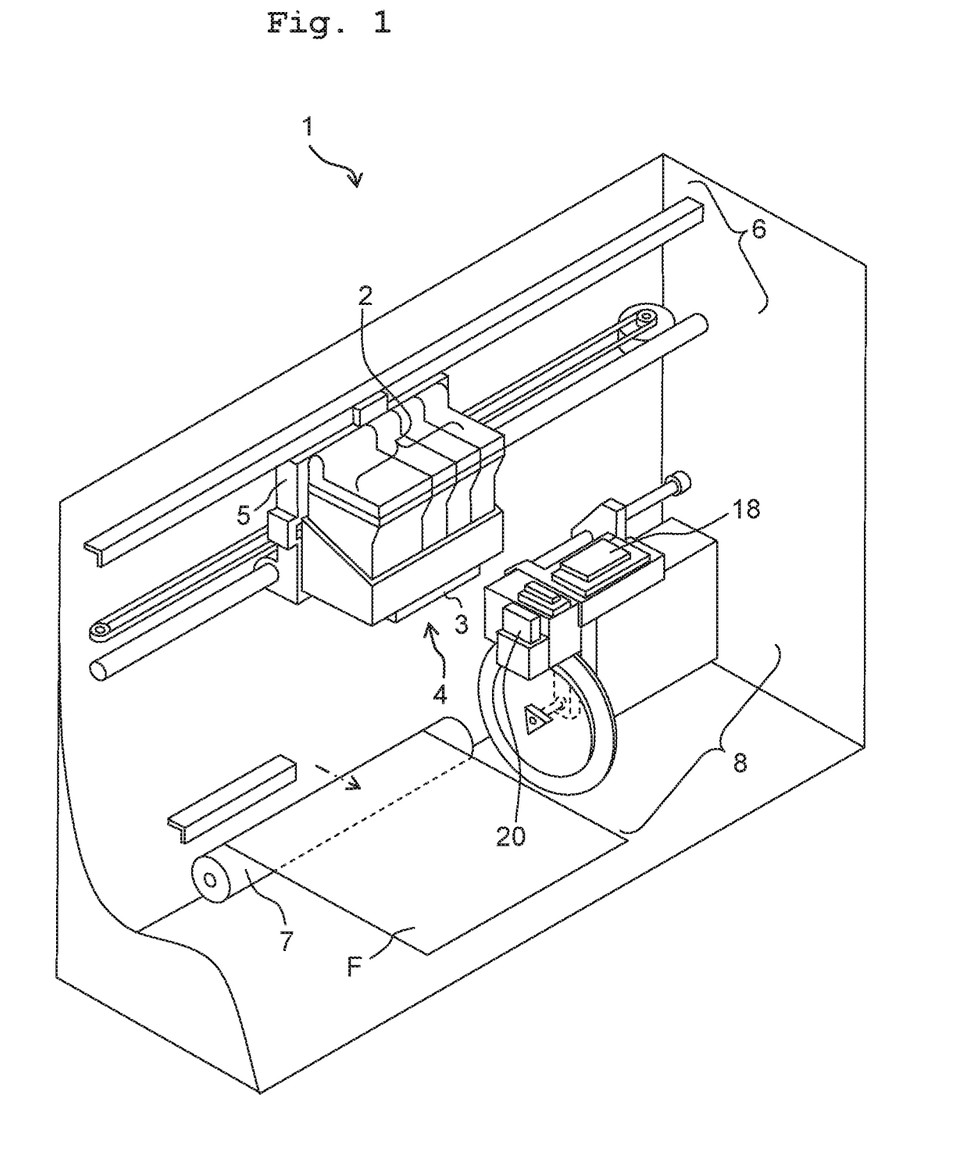
FIG. 1 is a schematic perspective view of an exemplary configuration of an ink-jet recording apparatus of the present teaching.

FIG. 1 depicts an exemplary configuration of the ink-jet recording apparatus of the present teaching. As depicted in FIG. 1, an ink-jet recording apparatus 1 includes four ink cartridges 1, an ink jetting mechanism (ink-jet head) 3, a head unit 4, a carriage 5, a driving unit 6, a platen roller 7 and a purge device 8 as main constitutive components or parts of the ink-jet recording apparatus 1.

Each of the four ink cartridges 2 stores one of four water-based inks of yellow, magenta, cyan, and black. For example, at least one of the four water-based inks is the water-based ink in the set including the ink and the treatment agent for image recording according to the present teaching. A set with the four ink cartridges 2 is adopted in this example. The present teaching, however, may use an integrated type ink cartridge of which interior is comparted (partitioned) to form a water-based yellow ink accommodating section, a water-based magenta ink accommodating section, a water-based cyan ink accommodating section, and a water-based black ink accommodating section. As a body of the ink cartridge, for example, any conventionally known main body of an ink cartridge may be used.

The ink-jet head 3 disposed on the head unit 4 performs recording on a fabric F. The four ink cartridges 2 and the head unit 4 are provided or arranged on the carriage 5. The driving unit 6 causes the carriage 5 to reciprocatingly move in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is disposed to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover nozzles of the ink-jet head 3 that returns to a reset position upon completion of recording, so as to inhibit the water-based inks from drying.

In the ink-jet recording apparatus 1 of the present embodiment, the four ink cartridges 2 are provided, together with the head unit 4, on one carriage 5. The present teaching, however, is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 via tubes, etc., and the water-based inks are supplied from the four ink cartridges 2, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which ink is poured from the outside to the inside of each of the ink bottles.

Recording by use of the ink-jet recording apparatus 1 is carried out, for example, as follows (see, FIG. 4).

Figure 3A:
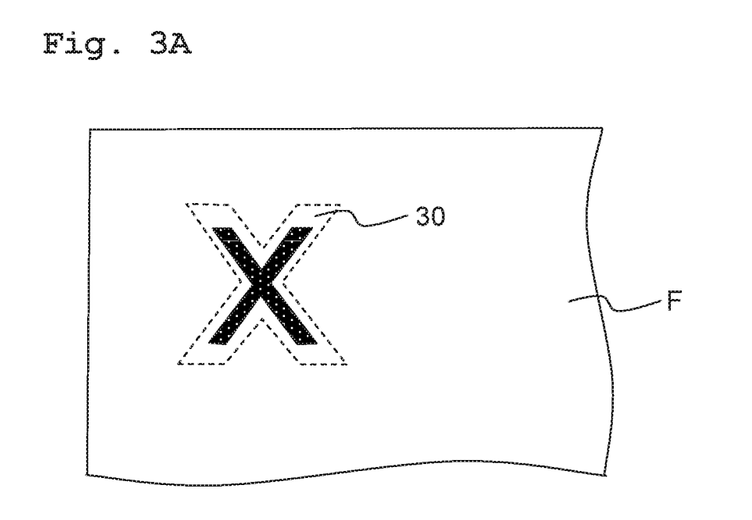
FIGS. 3A and 3B each depict an example of application of a treatment agent for image recording in a recording method of the present teaching.
Figure 3B:
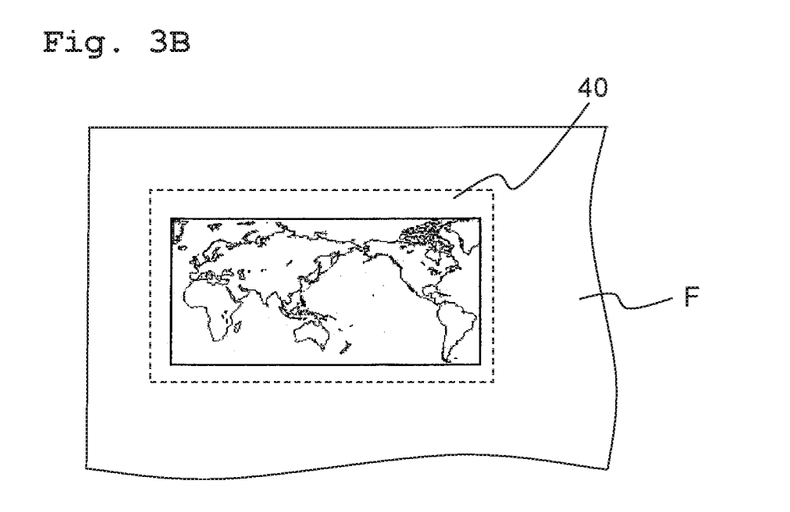
Figure 4:
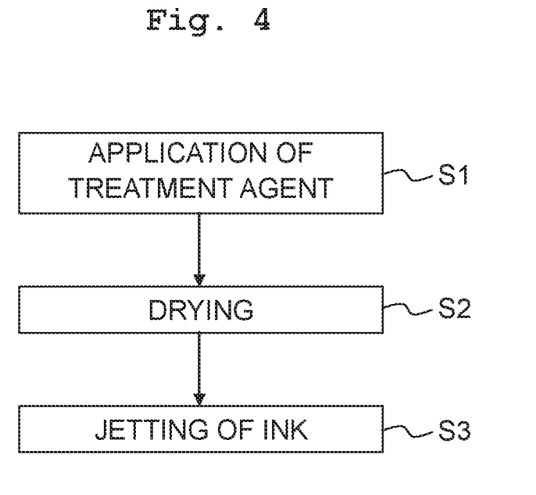
FIG. 4 is a flowchart showing the recording method of the present teaching.

At first, the treatment agent for image recording is applied to the fabric (a step S1 of FIG. 4). The application of the treatment agent for image recording can be carried out, for example, by means of a spray system, stamp application, brush application, roller application, dipping (immersion in the treatment agent), the ink-jet system, or the like. The treatment agent for image recording may be applied to the entirety (entire surface) or part of a recording surface of the fabric. When the treatment agent for image recording is applied to part of the recording surface, at least a recording portion, of the recording surface of the fabric, in which recording is (to be) performed by using the water-based ink is an application portion for the treatment agent for image recording. When the treatment agent for image recording is applied to part of the recording surface, the size of the application portion is preferably larger than the recording portion. For example, as depicted in FIG. 3A, when an image of a letter "X" is recorded on the fabric F, the treatment agent for image recording is preferably applied so that an application portion 30 has a line width larger than a line width of the letter. Further, as depicted in FIG. 3B, when a pattern is recorded on the fabric F, the treatment agent for image recording is preferably applied so that an application portion 40 is larger than the pattern.

Then, the treatment agent for image recording applied is dried (a step S2 of FIG. 4). The drying step inhibits blurring or bleeding in the recorded image, thus improving fastness to washing of the printed matter. The drying step may be performed, for example, before or after the recording step, and performing the drying step before the recording step is preferable. The drying may be, for example, air drying (natural drying). Alternatively, the drying may be performed by using any commercially available drying mechanism such as an iron, a hot press machine, a dryer, an oven, a belt conveyer oven or an IR heater. The drying temperature is, for example, in a range of 130° C. to 220° C. When the fabric is cotton, the drying temperature is preferably in a range of 180° C. to 210° C. When the fabric is polyester, the drying temperature is preferably in a range of 140° C. to 160° C. The drying temperature may be, for example, either a temperature of the drying atmosphere or a setting temperature of the drying mechanism. The drying time is, for example, in a range of 30 seconds to 120 seconds.

Figure 2:
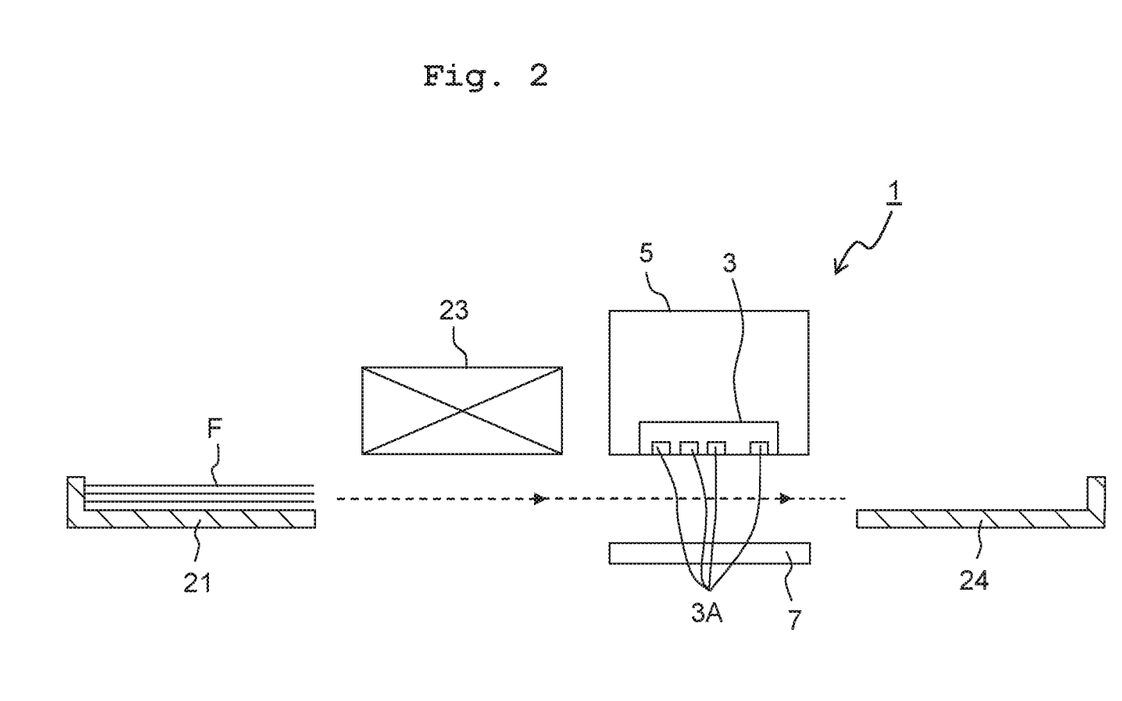
FIG. 2 schematically depicts an exemplary configuration of the ink-jet recording apparatus of the present teaching.

As depicted in FIG. 2, the drying step may be performed by using a drying mechanism 23 provided on the ink-jet recording apparatus 1, as depicted in FIG. 1, of the present teaching. The parts or components in FIG. 2 which are the same as those depicted in FIG. 1 are assigned with the same reference numerals. In FIG. 2, a reference numeral 21 indicates a supply tray (omitted in FIG. 1) and a reference numeral 24 indicates a discharge tray (omitted in FIG. 1); a reference numeral 3A indicates each nozzle formed in the lower surface of the ink-jet head 3. Further, the drying step may be performed, for example, at the outside of the ink-jet recording apparatus.

Next, the water-based ink is jetted to the fabric from the ink-jet head 3 to thereby perform recording (a step S3 of FIG. 4).

In this embodiment, the treatment agent for image recording is used as a pretreatment agent to be applied on the fabric before the water-based ink is jetted. The present teaching, however, is not limited thereto. In the present teaching, the treatment agent for image recording may be applied on the fabric after the water-based ink is jetted on the fabric, or application of the treatment agent for image recording on the fabric and jetting of the water-based ink may be performed at the same time. In view of inhibiting blurring in the recorded image, application of the treatment agent for image recording, drying of the treatment agent for image recording, and discharge of the water-based ink are preferably performed in that order.

A typical recording method of recording on a fabric includes, after the recording step, a heat fixing step of performing heat fixing of the water-based ink on the fabric. In the recording method of the present teaching, however, the heat fixing step is not indispensable.

The fabric F on which recording is performed is discharged from the ink-jet recording apparatus 1. Accordingly, the fabric on which recording is performed by using the treatment agent for image recording according to the present teaching can have a high optical density (OD value) and good fastness to washing. In FIG. 1, illustration of a supplying mechanism and a discharging mechanism of the fabric F is omitted.

The apparatus depicted in FIG. 1 adopts a serial type ink-jet head. The present teaching, however, is not limited to this. The ink-jet recording apparatus may be an apparatus which adopts a line type ink-jet head.

The recording method of the present teaching may include, for example, a washing step of washing the fabric with water. The washing step may be performed after the recording step. The washing step further improves water resistance of the printed matter.

The recording method of the present teaching as described above may be performed by using an ink-jet recording apparatus provided with the treatment-agent applying mechanism and/or the drying mechanism, or may be performed by using an ink-jet recording apparatus that is not provided with the treatment-agent applying mechanism and/or the drying mechanism. When the recording method is performed by using the ink-jet recording apparatus that is not provided with the treatment-agent applying mechanism and/or the drying mechanism, a user may apply the treatment agent to the fabric by, for example, a spraying method, and/or the user may dry the treatment agent applied to the fabric with an iron or a dryer.

<Method of Producing Fabric (Fabric Having Image)>

Subsequently, a method of producing a fabric according to the present teaching is explained. The method of producing the fabric according to the present teaching is a method of producing a fabric having an image, wherein recording is performed on the fabric by the recording method of the present teaching.

According to the method of producing the fabric of the present teaching, it is possible to obtain a fabric having a high optical density (OD value) and good fastness to washing.

<Fabric (Fabric Having Image)>

Subsequently, the fabric of the present teaching is explained. The fabric of the present teaching is a fabric having an image, wherein the fabric includes a cationic polymer emulsion and a cationic surfactant. The fabric having the image may include: a fabric; a layer (ink absorbing layer), formed on a surface of the fabric, which includes a cationic polymer and the cationic surfactant; and the image formed on the layer by use of a colorant.

In the fabric having the image according to the present teaching, the optical density (OD value) of the image is high and the fastness to washing is good.

EXAMPLES

Next, Examples of the present teaching are explained together with Comparative Examples. Note that the present teaching is not limited to or restricted by Examples and Comparative Examples described below.

Examples 1 to 15 and Comparative Examples 1 to 4

Respective components of Treatment Agent Composition (Table 2) were mixed uniformly or homogeneously, thereby obtaining treatment agents for image recording of Examples 1 to 15 and Comparative Examples 1 to 4.

With respect to the treatment agent for image recording of each of Examples 1 to 15 and Comparative Examples 1 to 4, (a) Evaluation of optical density (OD value), (b) Evaluation of fastness to washing, and (c) Evaluation of tactile sensation were performed by the following methods. The water-based inks used for each evaluation were prepared as follows.

<Preparation of Water-Based Inks>

<Preparation of Water-Based Dye Ink A>

Respective components of Ink Composition (Table 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus a water-based dye ink A for ink-jet recording was obtained.

<Preparation of Water-Based Pigment Ink B>

Respective components which were included in Ink Composition (Table 1) and which were different from CAB-O-JET (trade name) 300 were mixed uniformly or homogeneously; and thus an ink solvent was obtained. Subsequently, the ink solvent was added to CAB-O-JET (trade name) 300 followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based pigment ink B for ink-jet recording indicated in Table 1 was obtained.

Table 1 (Following)—LEGEND

TABLE 1

| Ink Composition | | | A | B |
|---|---|---|---|---|
| | Colorant | C.I. Direct Red 83 | 4.00 | — |
| | | CAB-O-JET (tradename) 300 (*1) | — | 4.00 |
| | Humectant | Glycerol | 20.00 | 20.00 |
| | Surfactant | Olfine (tradename) E1010 (*2) | 0.20 | 0.20 |
| | | Sunnol (tradename) NL1430 (*3) | 0.20 | 0.20 |
| | | Water | balance | balance |

The unit of the ink composition is % by mass
*1: Self-dispersible carbon black; produced by Cabot Corporation; the numerical value in Table 1 indicates a solid content amount;
*2: Nonionic surfactant; produced by Nissin Chemical Industry Co., Ltd.; the numerical value in Table 1 indicates an active ingredient amount;
*3: Anionic surfactant; produced by Lion Corporation; active ingredient: 28% by weight; the numerical value in Table 1 indicates an active ingredient amount.

(a) Optical Density (OD Value) Evaluation

About 1 g of the treatment agent for image recording according to each of Examples 1 to 14 and Comparative Examples 1 to 4 was uniformly applied by a spray method to a fabric (cotton, sheeting) having a plane size of 15 cm×5 cm. The fabric to which the treatment agent for image recording had been applied was dried for 2 minutes by using an iron set to a high temperature (in a range of 180° C. to 210° C.) of which upper limit temperature was 210° C. Subsequently, recording was performed with the water-based ink A or B indicated in Table 1 by using an ink-jet printer-equipped digital multifunction machine DCP-J4225N produced by BROTHER INDUSTRIES, LTD. The fabric on which recording had been performed was washed with water for 2 minutes while shaking the fabric in the water to such an extent that a part of the fabric was not rubbed with another part of the fabric. In this way, an evaluation sample was prepared. The optical density (OD value) of the recording portion of the recording surface of the evaluation sample was measured by using a spectrophotometer Spectro Eye produced by X-Rite (light source: $D_{50}$, field angle: 2°, ANSI-T). Further, a sample (blank) was prepared by use of the water-based ink A or B under the same conditions except that the treatment agent for image recording was not applied, and the optical density (OD value) of the blank was measured. In Examples 1 to 14 and Comparative Examples 1 to 4, the difference in the optical density (OD value) between the evaluation sample and the blank ($\Delta OD1$=OD value of evaluation sample−OD value of blank) was calculated and evaluation was performed in accordance with the following evaluation criterion. In Example 15, $\Delta OD1$=OD value of evaluation sample−OD value of blank was calculated similarly to Examples 1 to 14 and Comparative Examples 1 to 4 except that polyester (twill) was used as the fabric and the iron was set to medium temperatures (140 to 160° C.) of which upper limit temperature was 160° C. Then, evaluation was performed in accordance with the following evaluation criterion.

<Criterion for Evaluation of Optical Density (OD Value)>

AA: $\Delta OD$ exceeded 0.03.

A: $\Delta OD1$ exceeded 0.01 and equal to or less than 0.03.

B: $\Delta OD1$ was equal to or more than −0.03 and equal to or less than 0.01.

C: $\Delta OD1$ was less than −0.03.

(b) Evaluation of Fastness to Washing

An evaluation sample made similarly to that of (a) Evaluation of optical density (OD value) was washed with approximately 5 liters of water to which 6.7 g of neutral detergent ("EMAL" (trade name) produced by KAO CORPORATION) had been added, for 2 minutes, while shaking the evaluation sample in the water. After washing, the optical density (OD value) of the recording portion of the recording surface of the evaluation sample was measured by using the spectrophotometer Spectro Eye (light source: $D_{50}$, field angle: 2°, ANSI-T), the difference in the optical density (OD value) between the evaluation sample after washing and the evaluation sample before washing ($\Delta OD2$=OD value after washing−OD value before washing) was calculated, and evaluation was performed in accordance with the following evaluation criterion.

<Criterion for Evaluation of Fastness to Washing>

AA: $\Delta OD2$ was equal to or more than −0.10.

A: $\Delta OD2$ was equal to or more than −0.15 and less than −0.10.

B: $\Delta OD2$ was equal to or more than −0.25 and less than −0.15.

C: $\Delta OD2$ was less than −0.25.

(c) Tactile Sensation Evaluation 10 examinees touched their fingers to an evaluation sample made similarly to that of (a) Evaluation of optical density (OD value) and an original cotton which was subjected neither to application of the treatment agent nor to recording using the water-based ink (in Example 15, original polyester which was subjected neither to application of the treatment agent for image recording nor to recording using the water-based ink). The number of examinees who felt that the evaluation sample was harder than the original cotton (in Example 15, the original polyester) was summed up, and evaluation was performed in accordance with the following evaluation criterion. In the optical density (OD value) evaluation, two kinds of samples including an evaluation sample using the water-based dye ink A and an evaluation sample using the water-based pigment ink B were used in Example 6 and Comparative Example 3. In the tactile sensation evaluation, only the evaluation sample using the water-based dye ink A was used in Example 6 and Comparative Example 3.

<Criterion for Evaluation of Tactile Sensation>

AA: The number of examinees who felt that the evaluation sample was harder than the original cotton was not more than one among ten examinees.

A: The number of examinees who felt that the evaluation sample was harder than the original cotton was two, three, or four among ten examinees:

B: The number of examinees who felt that the evaluation sample was harder than the original cotton was not less than five among ten examinees.

Table 2 indicates the compositions of the treatment agents for image recording and the evaluation results of Examples 1 to 15 and Comparative Examples 1 to 4.

Table 2 (Following)—LEGEND

TABLE 2

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 |
| Treatment Agent Composition (% by mass) | Cationic polymer emulsion (X) | MOWINYL (trade name) 6910 (*4) | 2.00 | 2.50 | 2.50 | 4.00 | 5.00 | 5.00 | 5.00 | 10.00 | 15.00 | 20.00 |
| | | SUPERFLEX (trade name) 620 (*5) | — | — | — | — | — | — | — | — | — | — |
| | | SUPERFLEX (trade name) 650 (*6) | — | — | — | — | — | — | — | — | — | — |
| | | MOWINYL (trade name) 6901 (*7) | — | — | — | — | — | — | — | — | — | — |
| | PAA (tradename)-05 (*8) | | — | — | — | — | — | — | — | — | — | — |
| | Humectant | Propylene glycol | 20.00 | 20.00 | 20.00 | 20.00 | 20.00 | 20.00 | 20.00 | 20.00 | 20.00 | 20.00 |
| | Surfactant | Lauryltrimethyl-ammonium sulfate (*9) (Y) | 4.00 | 4.00 | 3.00 | 3.00 | 3.00 | 2.00 | 0.50 | 0.50 | 0.50 | 0.50 |
| | | Olfine (tradename) E1010 (*2) | — | — | — | — | — | — | — | — | — | — |
| | | Water | balance | balance | balance | balance | balance | balance | balance | balance | balance | balance |
| | X/Y | | 0.50 | 0.63 | 0.83 | 1.33 | 1.67 | 2.50 | 10.00 | 20.00 | 30.00 | 40.00 |
| Evaluation | Optical density (OD value) | Water-based dye ink A | AA | AA | AA | AA | AA | AA | AA | AA | A | B |
| | | Water-based pigment ink B | — | — | — | — | — | — | — | — | — | — |
| | Fastness to washing | Water-based dye ink A | B | A | A | AA | AA | AA | AA | AA | AA | AA |
| | | Water-based pigment ink B | — | — | — | — | — | — | — | — | — | — |
| | Tactile sensation (the feel of fabric) | | AA | AA | AA | AA | AA | AA | AA | AA | AA | A |

| | | | Examples | | | | | Comparative Examples | | | |
|---|---|---|---|---|---|---|---|---|---|---|---|
| | | | 11 | 12 | 13 | 14 | 15 | 1 | 2 | 3 | 4 |
| Treatment Agent Composition (% by mass) | Cationic polymer emulsion | MOWINYL (trade name) 6910 (*4) | 25.00 | — | — | — | 10.00 | 5.00 | 5.00 | — | — |

TABLE 2-continued

| | | | | | | | | | | | |
|---|---|---|---|---|---|---|---|---|---|---|---|
| | (X) | SUPERFLEX (trade name) 620 (*5) | — | 5.00 | — | — | — | — | — | — | — |
| | | SUPERFLEX (trade name) 650 (*6) | — | — | 5.00 | — | — | — | — | — | — |
| | | MOWINYL (trade name) 6901 (*7) | — | — | — | 5.00 | — | — | — | — | — |
| | | PAA (tradename)-05 (*8) | — | — | — | — | — | — | — | — | 5.00 |
| | Humectant | Propylene glycol | 20.00 | 20.00 | 20.00 | 20.00 | 20.00 | 20.00 | 20.00 | 20.00 | 20.00 |
| | Surfactant | Lauryltrimethyl-ammonium sulfate (*9) (Y) | 0.05 | 2.00 | 2.00 | 2.00 | 0.50 | — | — | 2.00 | 2.00 |
| | | Olfine (tradename) E1010 (*2) | — | — | — | — | — | — | 1.00 | — | — |
| | | Water | balance | balance | balance | balance | balance | balance | balance | balance | balance |
| | X/Y | | 50.00 | 2.50 | 2.50 | 2.50 | 20.00 | — | — | 0 | — |
| Evaluation | Optical density (OD value) | Water-based dye ink A | B | AA | AA | B | AA | C | C | AA | AA |
| | | Water-based pigment ink B | — | — | — | — | — | — | — | AA | — |
| | Fastness to washing | Water-based dye ink A | AA | A | A | A | AA | A | AA | C | C |
| | | Water-based pigment ink B | — | — | — | — | — | — | — | C | — |
| | Tactile sensation (the feel of fabric) | | B | AA | A | B | AA | AA | AA | AA | A |

As indicated in Table 2, in Examples 1 to 15, the evaluation results were satisfactory in relation to the optical density (OD value), the fastness to washing, and the tactile sensation. Examples 1 to 11 using the same cationic polymer emulsion were compared with each other. In Examples 2 to 11 satisfying X≥2.5, the evaluation results of fastness to washing by use of cotton were better than that of Example 1 satisfying X<2.5. In Examples 1 to 10 satisfying X≤20, the evaluation results of tactile sensation by use of cotton were better than that of Example 1 satisfying X>20. In Examples 2 to 11 satisfying X/Y≥0.6, the evaluation results of fastness to washing by use of cotton were better than that of Example 1 satisfying X/Y<0.6. In Examples 4 to 11 satisfying X/Y≥1.3, the evaluation results of fastness to washing by use of cotton were better than those of Examples 2 and 3 satisfying X/Y<1.3. In Examples 1 to 9 satisfying X/Y≤30, the evaluation results of optical value (OD value) by use of cotton were better than those of Examples 10 and 11 satisfying X/Y>30. In Examples 1 to 8 satisfying X/Y≤20, the evaluation results of optical value (OD value) by use of cotton were better than that of Example 9 satisfying X/Y>20.

*4: Urethane-acrylic emulsion (ester-based urethane structure); produced by JAPAN COATING RESIN CO., LTD.; the numerical values in Table 2 indicate solid content amounts
*5: Urethane-acrylic emulsion (ester-based urethane structure); produced by DKS CO., LTD. (Dai-ichi Kogyo Seiyaku Co., Ltd.); the numerical value in Table 2 indicates a solid content amount
*6: Urethane-acrylic emulsion; produced by DKS CO., LTD. (Dai-ichi Kogyo Seiyaku Co., Ltd.); the numerical value in Table 2 indicates a solid content amount
*7: Styrene-acrylic emulsion: produced by JAPAN COATING RESIN CO., LTD.; the numerical value in Table 2 indicates a solid content amount
*8: Cationic water-soluble polymer; produced by NITTOBO MEDICAL CO.,
*9: Cationic surfactant
*2: Nonionic surfactant; produced by Nissin Chemical Industry Co., Ltd.; the numerical value in Table 2 indicates an active ingredient amount Examples 6 and 12 to 14 having mutually different kinds of cationic polymer emulsions and having the same conditions except for the above were compared with each other. In Examples 6, 12, and 13 in which the cationic polymer emulsion had the urethane structure, the evaluation results of tactile sensation by use of cotton were better than that of Example 14 in which the cationic polymer emulsion had no urethane structure. In Examples 6 and 12 in which the cationic polymer emulsion had the ester-based urethane structure, the evaluation results of tactile sensation by use of cotton were better than that of Example 13 in which the cationic polymer emulsion had no ester-based urethane structure.

On the other hand, in Comparative Example 1 using no cationic surfactant, the evaluation result of the optical density (OD value) by use of cotton was bad. Also in Comparative Example 2 using the nonionic surfactant instead of the cationic surfactant, the evaluation result of the optical density (OD value) by use of cotton was bad. In Comparative Example 3 using no cationic polymer emulsion, the evaluation result of fastness to washing by use of cotton was bad. Also in Comparative Example 4 using the cationic water-soluble polymer instead of the cationic polymer emulsion, the evaluation result of fastness to washing by use of cotton was bad.

As described above, the treatment agent for image recording of the present teaching allows the fabric on which recording is performed by use of the treatment agent to have a high optical density (OD value) and good fastness to washing. The way of use of the treatment agent for image recording of the present teaching is not particularly limited and is widely applicable to recording on different types of fabrics and on any other recording medium than the fabric, such as recording paper.

What is claimed is:

1. A treatment agent for image recording comprising:
a cationic polymer emulsion; and a cationic surfactant;
wherein the following conditions (1) and (2) are satisfied, $$2.5 < X < 20 \tag{1}$$

$$0.6 \leq X/Y \leq 30 \tag{2}$$

in the conditions (1) and (2),
X: a solid content amount (% by mass) of the cationic polymer emulsion in an entire amount of the treatment agent for image recording, and Y: a content amount (% by mass) of the cationic surfactant in the entire amount of the treatment agent for image recording.

2. The treatment agent for image recording according to claim 1, wherein a cationic polymer in the cationic polymer emulsion has a urethane structure.

3. The treatment agent for image recording according to claim 2, wherein the cationic polymer having the urethane structure further has at least one of an acrylic structure and a styrene structure.

4. The treatment agent for image recording according to claim 1, wherein a cationic polymer in the cationic polymer emulsion has an ester-based urethane structure.

5. The treatment agent for image recording according to claim 1, wherein the following condition (3) is satisfied, $$1.3 \leq X/Y \leq 20 \tag{3}.$$

6. The treatment agent for image recording according to claim 1, wherein the cationic surfactant includes a cationic surfactant represented by the following formula (1):

(1)

in the formula (1), each of $R^1$ to $R^4$ is a hydrocarbon group having 1 to 30 carbon atoms; $R^1$ to $R^4$ are identical with each other or different from each other; and $X^-$ is an anion.

7. The treatment agent for image recording according to claim 6, wherein, in the formula (1), each of $R^1$ to $R^3$ is an alkyl group having 1 to 5 carbon atoms;

$R^1$ to $R^3$ are identical with each other or different from each other;

$R^4$ is an alkyl group having 6 to 30 carbon atoms;

the alkyl group of each of $R^1$ to $R^4$ has or does not have a substituent group;

the alkyl group of each of $R^1$ to $R^4$ has a straight chain or a branched chain; and $X^-$ is an anion.

8. The treatment agent for image recording according to claim 7, wherein, in the formula (1), $X^-$ is at least one selected from the group consisting of: methylsulfate ion, ethylsulfate ion, sulfate ion, nitrate ion, acetate ion, dicarboxylate ion, tricarboxylate ion, and hydroxide ion.

9. The treatment agent for image recording according to claim 1, wherein the cationic polymer emulsion includes a dispersion medium and particles of a cationic polymer dispersed in the dispersion medium.

10. The treatment agent for image recording according to claim 1, further comprising propylene glycol.

* * * * *